United States Patent

[11] 3,596,457

| [72] | Inventors | Ernest L. Van Tine<br>Bellevue, Wash.;<br>Wesley R. Wagner, 5332 S. Fountain St.,<br>Seattle, Wash. 98178 |
|---|---|---|
| [21] | Appl. No. | 869,044 |
| [22] | Filed | Oct. 24, 1969 |
| [45] | Patented | Aug. 3, 1971 |
| [73] | Assignee | said Wagner by said Van Tine |

[54] FRUIT HARVESTER
19 Claims, 4 Drawing Figs.

[52] U.S. Cl. ................................................ 56/330
[51] Int. Cl. ................................................ A01g 19/00
[50] Field of Search ....................................... 56/330, 331, 19, 130

[56] References Cited
UNITED STATES PATENTS

| 2,660,021 | 11/1953 | McDowell | 56/330 |
| 3,142,949 | 8/1964 | Carlson | 56/19 |
| 3,184,908 | 5/1965 | Rust | 56/330 |
| 3,255,578 | 6/1966 | Perties | 56/330 |
| 3,494,117 | 2/1970 | Weygandt et al. | 56/330 |

Primary Examiner—Russell R. Kinsey
Attorney—Graybeal, Cole & Barnard

ABSTRACT: The harvester is a self-propelled vehicle having two side assemblies adjustably connected together near the top of the vehicle. A divider depends from the interconnecting frame structure downwardly into a front-to-rear tunnel defined by and between the two side assemblies. A row of fruit collector boxes is supported on each side of the tunnel. The divider divides the bushes traveling relatively through the tunnel into two parts and deflects the parts laterally outwardly into the paths of the bush shakers, generally above the collector boxes. Each shaker includes a wheel mounted for rotation about a fixed horizontal support extending longitudinally of the vehicle. This support is rotated for swinging the wheel upwardly through fruit ladened branches. The wheel includes a plurality of radial tines and means for reciprocating it back-and-forth on its support. Air screens are provided for directing the falling fruit towards the collector boxes. The vehicle drive mechanism includes differential gearing mechanism having a pair of output shafts. A system of chains and sprockets drivingly connects each output shaft to a plurality of small diameter drive wheels on its side of the vehicle. The output shafts are provided with independently controllable brakes used for steering the vehicle.

INVENTORS:
ERNEST L. VAN TINE
WESLEY R. WAGNER,
BY Graybeal, Cole &
Barnard
ATTORNEYS

PATENTED AUG 3 1971

INVENTORS:
ERNEST L. VAN TINE
WESLEY R. WAGNER,
BY Graybeal, Cole &
Barnard
ATTORNEYS

FRUIT HARVESTER

BACKGROUND OF THE INVENTION

1. Field of the Invention

This invention relates to fruit harvesters and more particularly to a vehicular-type harvester for bush fruit (e.g. blueberries).

2. Description of the Prior Art

Rust, U.S. Pat. No. 3,184,908; Pertics, U.S. Pat. No. 3,225,578; Christie et al., U.S. Pat. No. 3,325,984; Christie et al., U.S. Pat. No. 3,344,591; Christie et al., U.S. Pat. No. 3,385,042; and Pertics, U.S. Pat. No. 3,449,895, disclose berry harvesting machines which are adapted for moving along a row of berry bushes. These machines include a frame structure which straddles the bushes, berry collector means, and bush shaking mechanisms. The bush shaking mechanisms comprise elongated shaker wheels mounted for rotation about vertical axes. These wheels include radial tines which project into the fruit ladened portion of the bushes and means for reciprocating the wheels up and down along their axes. A principal disadvantage of this type of bush shaking mechanism is that the tines catch in the branches or foliage of the bushes and when the wheels are moved upwardly such tines tend to tear the bushes or pull them out of the ground.

SUMMARY OF THE INVENTION

This invention relates primarily to mechanisms for effectively shaking berry bushes and other fruit plants for dislodging ripe fruit from them without exerting a force on the bush or plant which is opposed by the grip of the plant's roots with the ground, or which will strip the branches from the cane of the bushes.

Essentially, the bush shaking mechanism of this invention comprises one or more shaker wheels mounted for rotation about a horizontal support shaft, means for swinging such shaft and the wheel(s) upwardly through a fruit ladened portion of the bush along an arcuate path that is perpendicular to the axes of the wheel and its support shaft, and means for reciprocating the shaker wheel axially back-and-forth on its support shaft as the wheel is moved through the fruit plant. As the wheel travels upwardly through the plant it exerts through its tines a generally horizontal shaking force on the plant, for dislodging fruit therefrom, but not an upward tearing or dislodging force in opposition to the grip of the plant's roots with the soil. Each shaker wheel is mounted for free rotation about its support shaft so that in response to tine interference with the plant the shaker wheel will rotate relative to its support shaft until the tine is in a position to be withdrawn generally endwise out from the plant by additional arcuate travel of the shaker wheel.

This invention also relates to particular assemblies of a plurality of shaker wheels of this type, to drive mechanisms for such assemblies, and to particular arrangements of the bush shaking mechanisms with respect to fruit collector means and with respect to apparatus for deflecting fruit-ladened portions of the bushes laterally over into positions in the path of the shaker wheels and generally over the fruit collector means, without harming the bushes or tearing them loose from the ground.

The invention further relates to a laterally adjustable frame construction for the harvester or a similar vehicle and to a particular drive mechanism for the vehicle.

DESCRIPTION OF THE PREFERRED EMBODIMENTS

Figure 1:
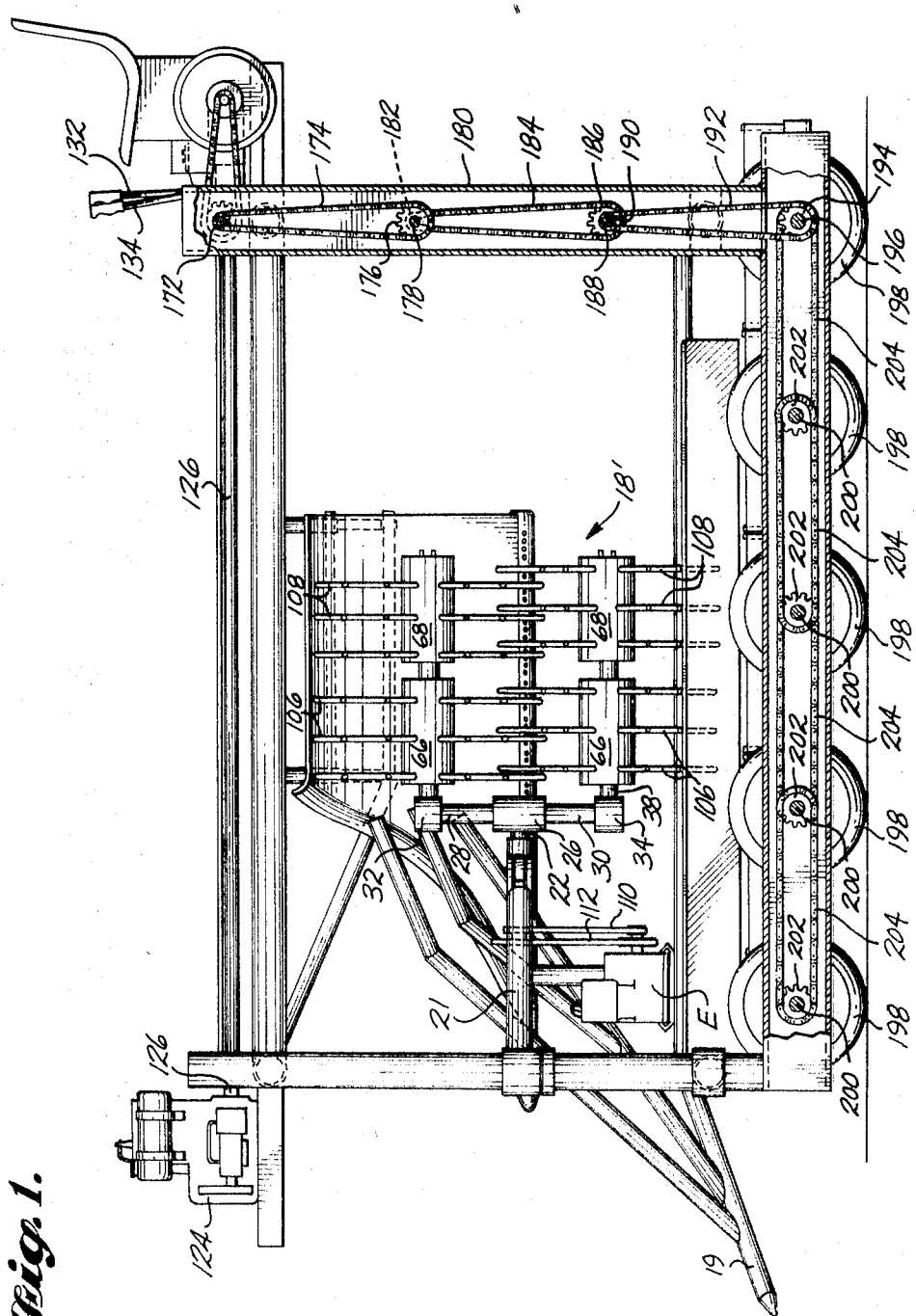
FIG. 1 is a side elevational view of a bush berry picking, self-propelled vehicular embodiment of the invention, with the outside walls of certain hollow frame members of such machine being cut away for the purpose of exposing drive transmission mechanism which is housed therein.

The illustrated embodiment is especially adapted for use in picking bush berries (e.g. blueberries). It is a self-propelled vehicle comprising two side assemblies which are connected together across the top of the machine only. A tunnel or passageway 10 is formed by and between the two side assemblies. In use the machine straddles a row of berry bushes 12 as it travels and such bushes travel relatively through passageway 10. An overhead parting device, spreader or divider 14 extends longitudinally of the passageway 10. It is laterally centered with respect to the passageway 10 and is supported from the vehicular frame in a position to pass relatively through only the upper berry ladened portions of the bushes. Divider 14 parts the berry ladened portions of the bushes into two parts 16, 16' and bends them over into positions within the path of travel of bush shaking mechanisms 18, 18'. Fender structures 19 provided relatively low on each side of the passageway 10 present smooth side surfaces along which lower portions of the bushes ride. The construction of these fenders 19 may vary but for purposes of example they are shown in the form of tubular longitudinal members flared out at the front of the machine and then extending in parallelism longitudinally through the machine in positions bordering passageway 10.

SHAKER MECHANISMS

Figure 4:
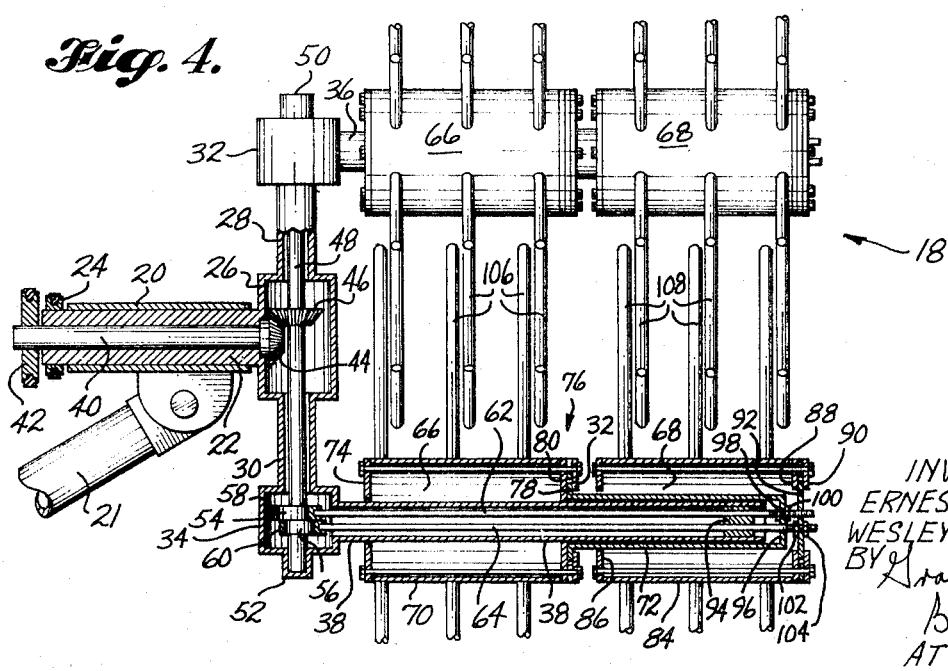
FIG. 4 is a fragmentary view partially in side elevation and partially in section of one of the shaking mechanisms.

Each bush shaking mechanism 18, 18' comprises a pair of shaker assemblies spaced 180° apart and mounted for arcuate travel through the bush parts 16, 16'. As best shown by FIG. 4, the mounting apparatus for each bush shaking mechanism comprises a tubular sleeve bushing 20 having an axis which is parallel to the direction of vehicle movement, and hence parallel to the direction of relative movement of the bushes through the machine. Each sleeve 20 is fixed in position relative to the chassis by means including a strut 21. A tubular shaft 22 extends through the sleeve 20 and projects outwardly therefrom at both of its ends. A drive pulley 24 is secured to the forward end portion of shaft 22 and the rearward end of shaft 22 is connected to a hollow hub 26. A pair of tubular arms 28, 30 extend in opposite directions radially outwardly from the hub 26. Arm 28 is connected at its outer end to a hollow housing 32. A first tubular support shaft 36 extends longitudinally of the vehicle from housing 32 and a second tubular support shaft 38 extends in similar fashion from housing 34. The axes of shafts 36, 38 are parallel with each other and with the axes of sleeve 20 and shaft 22, and all of these axes are situated within a common plane.

A center shaft 40 extends longitudinally through the hollow shaft 22 and at its forward end extends forwardly beyond shaft 22. A belt pulley 42 is secured to the projecting forward end portion of shaft 40. A first bevel gear 44 is secured to the rear end of shaft 40 within hub 26. Also within hub 26 the first bevel gear 44 meshes with a second bevel gear 46. The second bevel gear 46 is fixed to an intermediate portion of a cross shaft 48. The opposite halves of the cross shaft 48 extend first through the tubular arms 28, 30, then through the housings 32, 34 and at their outer ends are supported for rotation in supporting sockets 50, 52.

A pair of crank lobes 54, 56 are provided on the shaft 48 within each of the housings 32, 34. Lobes 44, 46 are circular in cross section and are eccentrically mounted with respect to the shaft 48 one hundred eighty degrees (180°) apart from each other. A first ring or sleeve 58 surrounds lobe 54 and a second ring or sleeve 60 surrounds lobe 56. A first pitman 62 is connected to ring 58 and a second pitman 64 is connected to ring 60. The pitmans 62, 64 extend from the rings 58, 60 generally parallel to each other through the tubular shafts 36, 38.

A pair of shaker wheels 66, 68 are supported on each shaft 36, 38. Wheels 66, 68 are each adapted to rotate freely and to shift back-and-forth axially during rotation of the mechanism 18 about the axis of shaft 22. The mechanisms permitting or providing these movements will now be described in connection with the lower pair of shaker wheels 66, 68 shown in section in FIG. 4. It is to be understood that the support and drive mechanism for the upper pair of wheels 66, 68 are of like construction.

Wheel 66 include a drumlike hub 70 to which is secured a tubular axial extension 72. A radial wall 74 is provided at the forward end of hub 70 and shaft 38 fits in a central opening in wall 74. This opening in the wall 74 and the inside diameter of tube 72 are slightly larger in diameter than the tubular shaft 38. A rotatable connection 76 is provided between the extension 72 and the hub 70. The inner end of extension 72 includes a radial flange 78. This flange 78 is loosely sandwiched between a pair of annular plates 80, 82 projecting radially inwardly from the cylindrical wall of hub 70 into positions on opposite sides of flange 78. This connection ties the hub 70 and the extension 72 together for conjoint movement axially along shaft 38, but permits the hub 70 to rotate about shaft 38 apart from the extension 72. Wheel 68 is of similar construction. It includes a cylindrical hub 84 having an inner end wall 86 and a pair of axially spaced retaining flanges 88, 90 at its outer end. A circular disc plate 92 is loosely sandwiched between the flanges 88, 90. By this arrangement the hub 84 is free to rotate about extension 72 and plate 92 while at the same time the plate 92 is tied to the hub 84 for conjoint axial movement therewith.

The pitmans 62, 64 extend from their respective rings 58, 60 axially through shaft 38 and through axial bores in a guide block 94. The pitmans 62, 64 extend axially outwardly from the guide block 94 through oversized openings in an end wall 96 on extension 72 and then through oversized openings in disc 92. A pair of abutments 98, 100 are attached to pitman 62 on opposite sides of wall 96. The abutments 98, 100 connect the extension 72 and the hub 70 to pitman 62 and the abutments 102, 104 connect disc 92 and wheel hub 84 to pitman 64.

A plurality of tines or fingers 106, 108 project radially outwardly from the hubs 70, 84 of the wheels 66, 68. In the illustrated embodiment each wheel 66, 68 includes 10 angularly spaced rows of tines and three tines per row. In each shaker mechanism 18, 18' the tines 106 for each wheel 66 interleave with the tines 106 on the second wheel 66 and the tines 108 on each wheel 68 interleave with the tines 108 on the second wheel 68. This arrangement is quire clearly shown by FIG. 4 of the drawing.

Figure 3:
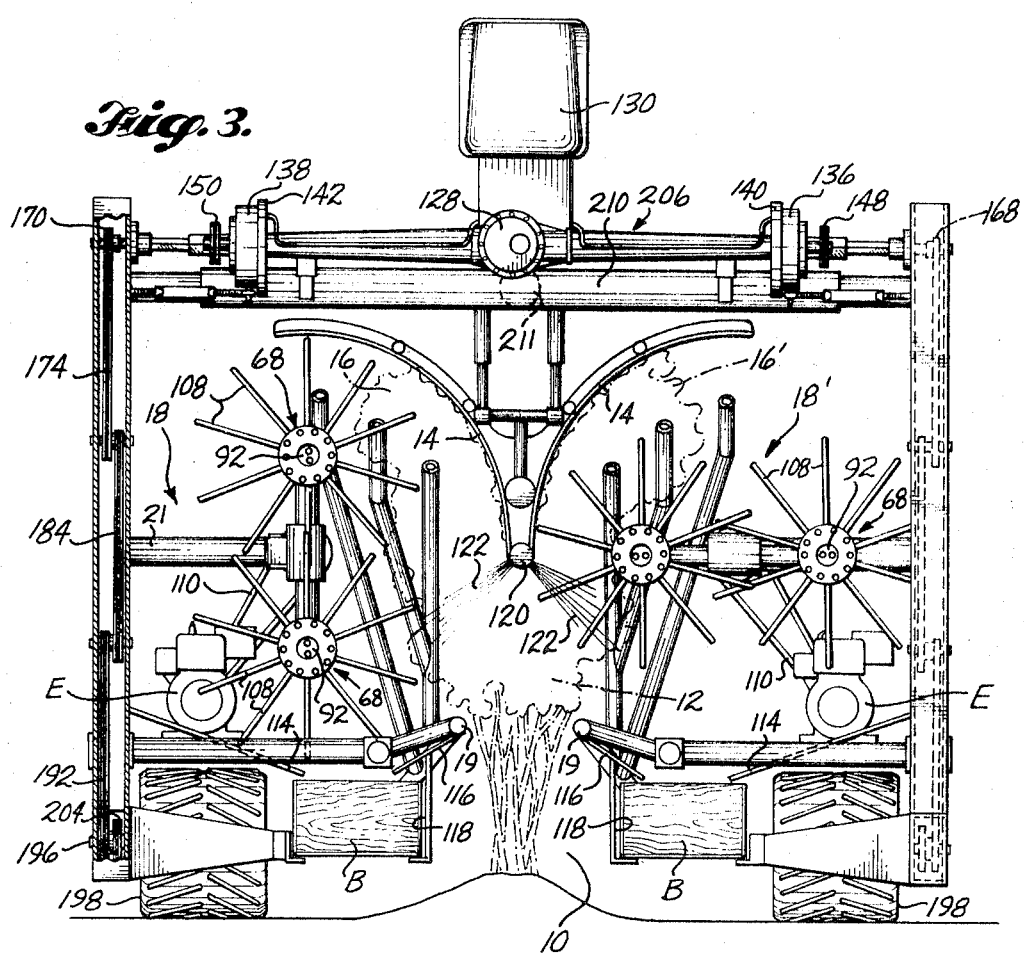
FIG. 3 is a rear elevational view of the machine, including a showing of a row of berry bushes in the process of being divided into two parts and each bush part being subjected to a shaking action by the shaking mechanisms, and showing the use of fluid screens for directing falling berries towards collector boxes therefor.

Referring to FIG. 3 in particular, an engine E is shown positioned at each side of the machine in association with the shaker mechanism 18, 18' on its side of the machine. A pair of drive belts 110, 112 interconnect between pulleys on the output shaft of each engine E and pulleys 24, 42. The direction of rotation of the shafts 22 is such that the wheels 66, 68 are swung upwardly through the berry ladened bush portion 16, 16'. Since the wheels 66, 68 are freely rotatable about their respective mountings, they exert no tearing or lifting force on the bush branches. Rather, if a tine meets resistance as it moves relatively through the bush part 16, 16', the wheel 66, 68 of which it is a part is rotated by the resistance force relatively about its support while such support continues to move along its arcuate path until such tine is in a position to be pulled axially out from the bush part 16 or 16'.

Referring again to FIGS. 3 and 4, belt 110 drives pulley 42 and the center shaft 40 connected thereto. Shaft 40 in turn drives shaft 48 through bevel gears 44, 46. Rotation of shaft 48 causes an orbiting action of the circular lobes 54, 56. The orbiting lobes 54, 56 in turn push and pull the pitmans 62, 64, causing each of them to reciprocate throughout a stroke distance equal to twice the amount of offset of the centers of lobes 54, 56 from the rotational center of shaft 48. Since the lobes 54, 56 are offset on opposite sides of the shaft 48 from each other the pitmans 62, 64 are always moving opposite to each other. The pitmans 62, 64 in turn reciprocate the wheels 66, 68 throughout the same stroke distance and of course the wheels 66, 68 are also always moving opposite to each other. In each mechanism 18, 18' the two wheels 66 move together and the two wheels 68 move together. Hence, the relationship of the tines 106, 108 of one set of wheels 66, 68 always remains about constant with respect to the tines 106, 108 of the other two wheels 66, 68 and there is never any contact of one set of tines 106 or 108 with another set of tines 106 or 108.

The moving tines 106, 108 exert shaking forces on the bush branches, causing the ripe berries to fall from the branches downwardly towards sloping guide plates 114, 116 which longitudinally border the open tops of a row of receiving boxes B. This shaking force is directed horizontally on the bush parts 16, 16' so it has no tendency to pull the bushes from the ground. An elongated channel 118 is formed in the lower portion of each side assembly of the machine at immediately bordering the opposite sides of the passageway 10, for receiving and supporting a row of collector boxes B. The boxes B are tight together within the channels, i.e. no gaps exist between them. When the boxes are substantially full they are moved endwise outwardly from one end of the channels 118, such as by shoving a new set of empty boxes inwardly from the opposite end of the channels 118.

AIR SCREENS

According to the invention, an air manifold 120 extends longitudinally of the divider 14 near the lower apex thereof. The manifold 120 includes one or more rows of tine jet openings on each of its sides. The air issuing from these openings forms a fluid screen 122 on each side of the divider 14 which serves to direct the falling berries laterally outwardly to a position over the sloping entrance plates 114, 116 leading into the collector boxes B. As will be appreciated, these screens 122 serve to prevent berries from falling downwardly through the passageway 10 and onto the ground. Similar fluid screens (not shown) may be arranged to blow laterally over the mouths of the boxes B for the purpose of blowing leaves away from the entrances of the boxes B. The berries are heavier than the leaves so these additional jets would be made of sufficient strength to blow aside the leaves but not the berries.

VEHICLE DRIVE MECHANISM

Figure 2:
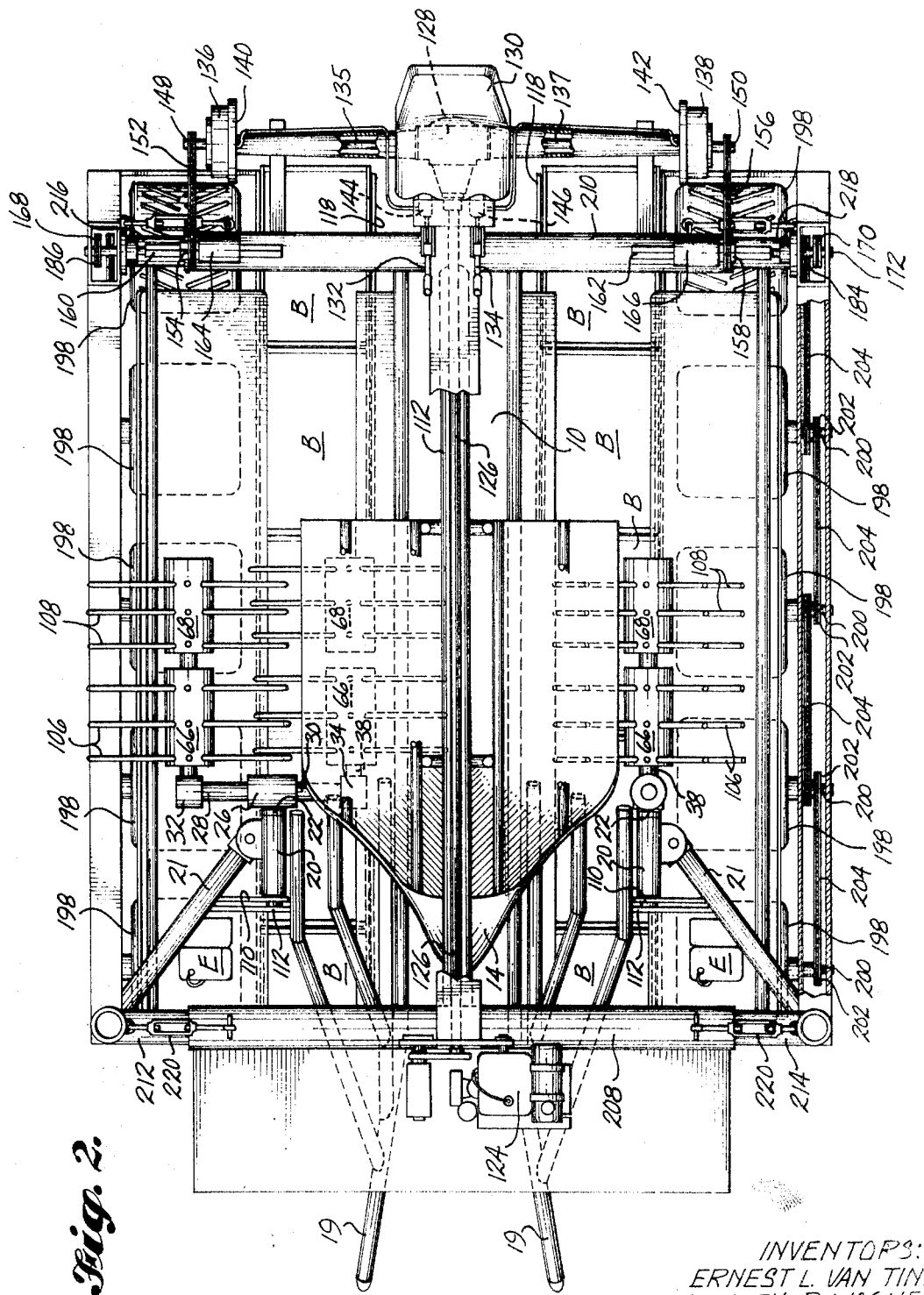
FIG. 2 is a top plan view of the fruit-picking machine of FIG. 1.

The drive mechanism for the vehicle includes an internal combustion engine 124 shown in FIGS. 1 and 2 mounted at the upper forward end of the vehicle. An elongated drive shaft 126 extends rearwardly from the internal combustion engine 124 to a differential gearing assembly 128 of the type commonly associated with a motor vehicle. An operator's seat 130 is located above the differential 128. A pair of master cylinder control levers 132, 134 are located in front of the operator's station in easy reach of the operator. A first drive shaft 135 extends laterally outwardly from differential 128 to a right side wheel 136. Similarly, a second drive shaft 137 extends laterally from differential 128 to a left-side wheel 138. Right wheel 136 is provided with a hydraulic brake 140 and left wheel 138 is provided with a hydraulic brake 142. Lever 132 controls a master cylinder 144 associated with brake 140 and lever 134 controls a master cylinder 146 associated with brake 142. The engine 126 includes a speed responsive clutch. When the throttle is advanced (by a control in near reach of the operator) beyond idle speed the clutch is engaged and completes a drive connection between the engine 124 and the drive shaft 126.

As shown by FIGS. 1—3, the output side of wheel 136 is connected to a sprocket 148 and the output side of wheel 138 is connected to a sprocket 150. A chain 152 connects sprocket 148 to a companion sprocket 154. A chain 156 connects sprocket 150 to a companion sprocket 158. Sprockets 154 and 158 have offround (e.g. square) open centers which receive elongated drive shafts 160, 162 of like cross-sectional configuration. Supports 164, 166 are associated with the pulleys 154, 158 and such supports 164, 166 have open centers for receiving the drive shafts 160, 162.

A sprocket 168 is connected to the outer end of drive shaft 160 and a like sprocket 170 is connected to the outer end of shaft 162. These sprockets 168, 170 are starting points of chain and sprocket transmission assemblies which extend from the shafts 160, 162 first downwardly through hollow rear columns 180 of the vehicle frame and then forwardly through hollow lower frame members to the vehicle wheels.

In FIGS. 1—3 the outer walls of the frame members which house the transmission apparatus for the left side of the machine are cut away for the purpose of exposing the transmission components. The transmission apparatus on the right side of the machine is of like character. Thus, the following description of the exposed transmission apparatus for the left side of the machine will suffice as a description for the transmission of the right side of the machine as well.

Sprocket 172 is a small diameter sprocket. A first drive chain 174 interconnects sprocket 172 with a larger diameter sprocket 176 supported on a short idle shaft 178 which projects laterally between, and is supported by, the sidewalls of column 180. A second small diameter sprocket 182 is also mounted on idle shaft 178. A second chain 184 interconnects between this sprocket 178 and a second large diameter sprocket 186. Sprocket 186 is on a common idle shaft 188 with another small diameter sprocket 190. A third chain 192 interconnects between sprocket 190 and another large diameter sprocket 194 on a rear wheel shaft 196. A first of five left side "bog" wheels 198 is connected to shaft 196. The other four wheels 198 are located forwardly of the rear wheel 198 and are connected to wheel shafts 200. Rear wheel shaft 196 includes a second sprocket 202, the front wheel shaft 200 includes a single sprocket 202, and the three intermediate wheel shafts 200 each include a pair of sprockets 202. A series of drive chains 204 interconnect the sprockets 202 and complete the drive transmission from rear sprocket 194 to each of the four wheels forwardly of the rear wheel 198. The small to large diameter relationship of the first four pairs of sprockets which are coupled together by the first four drive chains effects a gear reduction from drive wheel 138 down to the vehicle wheels.

The wheels 198 have been referred to as "bog" wheels. These wheels are small in diameter and are wide. The provision of 10 wheels of this type on the vehicle make it possible to drive the vehicle in soft or boggy ground.

STEERING MECHANISM

The brake levers 132, 134 are used for turning the vehicle. When it is desired to turn the vehicle to the right, for example, the operator merely pulls back on the control lever 132 for the right side brake. The brake 136 holds the right side shaft 135 and the left-side shaft 137 alone is driven from the differential.

LATERAL ADJUSTMENT

The vehicle of this invention is made to be laterally adjustable. For example, it may be adjustable between a minimum width of about 8 feet, suitable for road travel, out to a maximum width of about 11 feet. This adjustment is achieved in a simple yet very effective manner. The divider 14, the operator seat 130 and all of the drive components 124, 126, 128, etc. are mounted on an upper central frame assembly, principal frame components of which are front and rear tubular crossmembers 208, 210 and a longitudinal tubular member 211. The side assemblies of the machine are self-contained and are connected to the upper frame assembly only by front and rear cross members 212, 214 and 216, 218. These members 212, 214, 216, 218 may be pieces of pipe welded at their outer ends to upper frame portions of the side assemblies. The front members 212, 214 are telescopically received within the front tubular member 208. In like fashion, the two rear cross frame members 216, 218 are telescopically received in the rear tubular cross frame member 210. Turnbuckle assemblies 220 may be provided for adjustably connecting the inner frame members 212, 214, 216, 218 to the outer frame member 208, 210 in which they are telescopically received.

The elongated shafts 160, 162 are slidably received within the hubs of sprockets 154, 158. Hence, adjustment outwardly of the side assemblies merely causes the shafts 160, 162 to be moved in position outwardly and inward adjustment causes them to be moved in position inwardly, with drive transmission being maintained at all times.

What I claim is;

1. A fruit harvester comprising:
   a shaker wheel including a plurality of radial tines;
   means supporting the shaker wheel with its axis generally horizontal;
   means for swinging said support, and the shaker wheel carried thereby, upwardly through a fruit-ladened portion of a fruit plant along an arcuate path of travel which is substantially perpendicular to the wheel axis; and
   means for reciprocating the shaker wheel axially back-and-forth on its support as the wheel moves through the fruit plant, so that as the wheel travels it exerts through its tines a generally horizontal shaking force on the plant, for dislodging fruit therefrom.

2. A fruit harvester according to claim 1, wherein the shaker wheel is mounted for free rotation so that in response to tine interference with the plant the shaker wheel will rotate relative to its support until the tine is in a position to be withdrawn generally endwise out from the plant by additional arcuate travel of the shaker wheel.

3. A fruit harvester according to claim 1, further comprising a ground-traversing vehicle, wherein said support means for said shaker wheel supports said shaker wheel on the vehicle in a position with its axis extending generally in direction of vehicle travel.

4. A fruit harvester according to claim 3, comprising means on said vehicle for contacting and positively moving a fruit-ladened portion of the plant sideways into the upward arcuate path of travel of the shaker wheel.

5. A fruit harvester according to claim 1, wherein the support means for the shaker wheel includes a tubular support shaft, wherein the shaker wheel includes a hub supported on said tubular shaft for axial movement therealong, and wherein the means for reciprocating the shaker wheel includes an elongated pitman within the tubular shaft, means connecting one end of the pitman to said wheel hub, and means connected to the opposite end of the pitman for alternately pushing and pulling the pitman.

6. A fruit harvester according to claim 5, wherein the means for alternately pushing and pulling the pitman includes a rotatable crankshaft extending generally perpendicular to the tubular support shaft, a crank means on said crankshaft connected to the pitman, and drive means for rotating said crankshaft.

7. A fruit harvester according to claim 6, wherein said crank means is a circular lobe eccentrically located on said crankshaft, and wherein a ring surrounds said lobe and said ring is connected to said pitman.

8. A fruit harvester according to claim 6, wherein said means for swinging said support along an arcuate path includes a tubular housing surrounding the crankshaft, said housing being connected at its outer end to the tubular support shaft for the shaker wheel and extending radially inwardly from said support shaft to a hub portion, and a main shaft connected to said hub portion and extending therefrom in a direction opposite from the direction of extent of said tubular support shaft from said tubular housing, with the axes of said main shaft and said tubular support shaft being parallel to each other and both being perpendicular to the axis of the crankshaft, and with the axes of all three shafts being situated in a common plane.

9. A fruit harvester according to claim 8, wherein said main shaft is hollow and an inner drive shaft extends axially therethrough, and wherein the hub portion of said tubular housing is hollow and contains drive-gearing means drivingly connecting said inner shaft to said pitman drive shaft.

10. A fruit harvester comprising:
an elongated support shaft;
a pair of shaker wheels axially spaced-apart on said shaft, each said wheel including a plurality of radial tines;
means supporting said support shaft with its axis generally horizontal;
means for swinging said support shaft, and the shaker wheels carried thereby, upwardly through a fruit-ladened portion of a fruit plant along an arcuate path of travel which is substantially perpendicular to the axes of said wheels and said support shaft; and
means for reciprocating the shaker wheels axially back-and-forth on the support shaft as they move through the fruit plant, so that as the wheels travel they exert through their tines a generally horizontal shaking force on the plant, for dislodging fruit therefrom.

11. A fruit harvester according to claim 10, wherein each shaker wheel includes a hub supported on said tubular shaft for axial movement therealong, and wherein the means for reciprocating the shaker wheels includes a pair of elongated pitmans within the tubular shaft, means connecting one end of one pitman to the hub of one of said wheels, means connecting the corresponding end of the second pitman to the hub of the second wheel, and means connected to the opposite ends of the pitmans for alternately pushing and pulling the pitmans.

12. A fruit harvester according to claim 11, wherein a tubular extension is connected to one of said shaker wheels, said extension surrounding said tubular shaft, and wherein the second shaker wheel surrounds the tubular extension, with the pitman for the first shaker wheel being connected to said tubular extension and with the pitman for the second wheel being connected to the end of the hub for said second wheel.

13. A fruit harvester according to claim 12, wherein the first shaker wheel includes joint means between it and the extension, coupling it and the extension together for conjoint axial movement but permitting said first shaker wheel to rotate about the tubular shaft independently of the extension, and joint means between the second shaker wheel and the pitman therefor, coupling such wheel and pitman together for axial movement but permitting free rotational movement of the second shaker wheel about the tubular extension and relative to its pitman.

14. A fruit harvester comprising:
a pair of parallel, spaced-apart support shafts, a transverse support arm extending between and interconnecting said support shafts;
a main shaft connected to an intermediate portion of said support shaft and extending therefrom and in parallelism with said support shafts;
means mounting said main shaft for rotation about a generally horizontal axis;
a shaker wheel on each support shaft, each shaker wheel including a plurality of radial tines;
means for rotating said main shaft about its axis and in that manner swinging the support shafts and the shaker wheels mounted thereon upwardly through a fruit-ladened portion of a fruit plant along arcuate paths of travel which are substantially perpendicular to the main shaft axis; and
means for reciprocating each shaker wheel axially back-and-forth on its support shaft as the wheel moves through the fruit plant, so that as the wheel travels it exerts through its tines a generally horizontal shaking force on the plant, for dislodging fruit therefrom.

15. A fruit harvester according to claim 14, wherein each shaker wheel is mounted for free rotation about its support shaft so that in response to tine interference with the plant the shaker wheel will rotate relative to its support shaft until the tine is in a position to be withdrawn generally endwise out from the plant by additional arcuate travel of the shaker wheel.

16. A fruit harvester comprising:
a vehicle including ground-engaging wheel means;
fruit collector means on said vehicle;
deflector means on said vehicle positioned to intercept an upper fruit-ladened portion of a fruit plant and shaped to bend it over laterally into a position generally over said collector means;
a shaker wheel mounted for rotation about a horizontal axis directed front-to-rear of said vehicle, said wheel including bush engaging projections;
means for swinging said wheel upwardly through the deflected portion of the bush along an arcuate path that is generally perpendicular to the axis of said wheel; and
means for reciprocating the wheel axially as it is being swung.

17. A fruit harvester according to claim 16, further comprising fluid screen means on said vehicle adapted to discharge towards the fruit collector means and to blow any fruit falling thereon towards the fruit collector means.

18. A fruit harvester comprising:
a vehicle including two side assemblies defining between them a passageway for a row of berry bushes or the like, each said assembly including ground-engaging wheel means;
divider means on said machine extending into the bush passageway and in use serving to divide the upper fruit-ladened portions of bushes traveling relatively through the passageway into two parts and to displace said parts laterally outwardly with respect to said passageway;
fruit collector means located laterally inwardly of the bush passageway, on each side thereof, and generally below the positions of the displaced bush parts; and
bush shaker means on each side assembly of the machine, including shaker tines, means for swinging said tines upwardly through the side parts of the bush, and means for reciprocating the tines back-and-forth along a line parallel to vehicle movement as the tines are moving upwardly through the bushes.

19. A vehicle to comprising two side assemblies defining a tunnel area between them which extends longitudinally of the vehicle;
frame means adjustably interconnecting upper portions of said side assemblies, said frame means including at least one laterally extending tubular splice member and a pair of cross frame members sized to fit within said splice member, each said cross frame member being attached at its outer end to a different one of said side assemblies, and being telescopically adjustable in position within said splice member;
means for securing said cross frame members in a selected telescopic position with respect to the tubular splice member;
divider means on said frame extending downwardly therefrom into the tunnel area and in use serving to divide the upper fruit-ladened portions of bushes traveling relatively through the tunnel into two parts and to displace said parts laterally outwardly with respect to said tunnel;
fruit collector means located laterally inwardly of the bush passageway, on each side thereof, and generally below the positions of the displaced bush parts; and
bush shaker means on each side assembly of the vehicle including shaker tines, means for swinging said tines upwardly through the side parts of the bush, and means for reciprocating the tines back-and-forth along a line parallel to vehicle movement as the tines are moving upwardly through the bushes.